Patented Dec. 27, 1932                                                          1,892,247

UNITED STATES PATENT OFFICE

WILHELM NEUGEBAUER, OF WIESBADEN-BIEBRICH, GERMANY, ASSIGNOR TO KALLE & CO. AKTIENGESELLSCHAFT, OF WIESBADEN-BIEBRICH, GERMANY

PROCESS OF PREPARING PROTEINASES FREE FROM PEPTIDASES

No Drawing. Application filed January 22, 1931, Serial No. 510,593, and in Germany January 31, 1930.

The present invention relates to a process of preparing proteinases free from peptidases.

The proteolytic ferment systems consist, as a rule, of mixtures of proteinases and peptidases. It has now been found that the proteinases can be freed from the peptidases in a surprisingly simple way by subjecting a solution of these mixtures of enzymes to the action of an acid medium, the acid employed being added in such a quantity that the solution attains a pH value of 3–4, preferably of 3.5. This treatment effects the destruction of the peptidases while the proteinases remain. The enzyme mixtures used are obtained in the usual manner from crude or dried glands, such as pancreas, liver, spleen, kidney, etc. The new process permits of using the most varied acids, such as hydrochloric acid, sulfuric acid, phosphoric acid, acetic acid, tartaric acid, etc.

For the subsequent use of the solutions freed in this manner from the peptidases it is advantageous to change the hydrogen ion concentration in a suitable manner, for instance, by the addition of alkalies, such as sodium carbonate, dilute caustic soda solution, ammonia, etc. or of such substances as have a buffering action.

The solutions which contain proteinases but are free from peptidases can be worked up to dry products, if desired after the pH value has been changed. To this end the known methods for the enzyme separation by precipitating reactions or also by careful evaporation in a vacuum or by an atomizing process are very suitable.

The products can be used for pharmaceutical and technical purposes for instance, for the manufacture of agents promoting the digestion, of peptones and of bateing or drenching agents.

The following examples illustrate the invention:

1. To a 5% solution of pancreas trypsin hydrochloric acid of 5 per cent strength is added, while stirring, until a pH value of 3.5 is attained. After a few minutes the peptic component of the trypsin is destroyed. The tryptase action, determined by the liquefying power with regard to gelatine, is almost completely maintained.

To obtain an optimum action of the tryptase, dilute sodium carbonate solution is added, while stirring, to the solution freed from the peptidases, until a pH value of about 8 is arrived at.

For the conversion into dry preparations the product is separated with twice or three times the quantity of acetone, filtered, washed with acetone and dried in a vacuum. It is, of course, also possible to transform the enzyme into a dry form in another way, for instance, by spraying.

2. 30 parts of a dry preparation prepared by treating fresh hog-liver with acetone and ether are stirred with 500 parts of water having a temperature of 0° C. to 5° C. Dilute hydrochloric acid is then added drop by drop, while stirring and further cooling, until the solution has attained a pH value of 3.4. The mixture is then allowed to stand at the same temperature for about 6 hours. After the lapse of this time the carboxypolypeptidase has disappeared or is present in a small amount only, whereas the activity of the proteinase is preserved to an extent of about 90 per cent. For determining in which quantities each of the two enzymes is present it is necessary to provide for a maximum activation by means of an activator, of the kind which is known for use with the liver protease, such as hydrogen sulfide, natural kinase, etc.

After destruction of the carboxypolypeptidase the mixture may be used, if desired after suitably changing the pH value, or may be worked up into dry preparations.

I claim:

1. The process of preparing proteinase preparations free from peptidases which comprises causing an acid to act upon a solution of an animal proteinase containing peptidases until the solution has reached a pH value of about 3–4 and allowing the mixture to stand for a short time.

2. The process of preparing proteinase preparations free from peptidases which comprises causing an acid to act upon a solution of an animal proteinase containing peptidases until the solution has reached a pH value of about 3-4, allowing the mixture to stand for a short time and treating the solution thus obtained with an agent of alkaline action.

3. The process of preparing proteinase preparations free from peptidases which comprises causing an acid to act upon an aqueous solution of an animal proteinase containing peptidases until the solution has reached a pH value of about 3-4, and allowing the mixture to stand for a short time.

4. The process of preparing proteinase preparations free from peptidases which comprises causing an acid to act upon an aqueous solution of an animal proteinase containing peptidases until the solution has reached a pH value of about 3-4, allowing the mixture to stand for a short time and treating the solution thus obtained with an agent of alkaline action.

5. The process of preparing proteinase preparations free from peptidases which comprises causing an inorganic acid to act upon an aqueous solution of an animal proteinase containing peptidases until the solution has reached a pH value of about 3-4 and allowing the mixture to stand for a short time.

6. The process of preparing proteinase preparations free from peptidases which comprises causing an inorganic acid to act upon an aqueous solution of pancreas trypsin until the solution has reached a pH value of about 3-4, allowing the mixture to stand for a short time and treating the solution thus obtained with an agent of alkaline action.

7. The process of preparing proteinase preparations free from peptidases which comprises causing hydrochloric acid to act upon an aqueous solution of pancreas trypsin until the solution has reached a pH value of about 3-4, allowing the mixture to stand for a short time and treating the solution thus obtained with an agent of alkaline action.

8. The process of preparing proteinase preparations free from peptidases which comprises causing hydrochloric acid of 5 per cent strength to act upon an aqueous solution of pancreas trypsin until the solution has reached a pH value of 3.5, allowing the mixture to stand for a short time and treating the solution thus obtained with an agent of alkaline action.

9. The process of preparing proteinase preparations free from peptidases which comprises causing hydrochloric acid of 5 per cent strength to act upon a solution of pancreas trypsin until the solution has attained a pH value of 3.5, allowing the mixture to stand for a short time and treating the solution thus obtained with a sodium carbonate solution until a pH value of about 8 has been reached.

In testimony whereof, I affix my signature.

WILHELM NEUGEBAUER.